United States Patent
Tian et al.

(10) Patent No.: US 12,287,441 B1
(45) Date of Patent: Apr. 29, 2025

(54) SYSTEM FOR UPDATING CLASTIC ROCK LITHOLOGY MODEL BY WELL-TO-SEISMIC INTEGRATION WITH DEEP EARTH OIL AND GAS PRECISION NAVIGATION

(71) Applicant: Institute of Geology and Geophysics, Chinese Academy of Sciences, Beijing (CN)

(72) Inventors: Fei Tian, Beijing (CN); Qingyun Di, Beijing (CN); Wenhao Zheng, Beijing (CN); Yongyou Yang, Beijing (CN); Wenjing Cao, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/412,597

(22) Filed: Jan. 14, 2024

(30) Foreign Application Priority Data

Oct. 19, 2023 (CN) .......................... 202311353155.9

(51) Int. Cl.
*G01V 1/28* (2006.01)
*G01V 1/40* (2006.01)

(52) U.S. Cl.
CPC ............... *G01V 1/282* (2013.01); *G01V 1/40* (2013.01)

(58) Field of Classification Search
CPC . G01V 1/282; G01V 1/40; G01V 1/36; G01V 1/306; G01V 1/302; Y02A 90/30; G06T 17/05; G06F 30/20
USPC ........................................................... 702/6
See application file for complete search history.

(56) References Cited

FOREIGN PATENT DOCUMENTS

| CN | 110685600 B | * | 1/2021 | ............. E21B 47/00 |
|---|---|---|---|---|
| CN | 112213797 A | | 1/2021 | |
| CN | 113759425 A | | 12/2021 | |
| CN | 116027454 A | | 4/2023 | |
| CN | 117150929 B | * | 12/2023 | |

OTHER PUBLICATIONS

English translation of CN 117150929B, Dec. 26, 2023 (Year: 2023).*

(Continued)

*Primary Examiner* — Michael P Nghiem
(74) *Attorney, Agent, or Firm* — Nitin Kaushik

(57) ABSTRACT

The present invention belongs to the technical field of geological exploration deep Earth. The system of the present invention is configured to: collect seismic data, and preprocess original seismic data to obtain standardized gamma ray logging parameters; extract features from the standardized gamma ray logging parameters to obtain a variance attribute curve while drilling; obtaining a formation thickness prediction model of each set based on the variance attribute curve while drilling; acquire frequency-division seismic data based on the standardized seismic data by means of a frequency-division processing method based on wavelet transform; acquire optimal seismic frequency band information based on a predicted formation thickness value of each set; establish a geological prediction model of the current formation based on the frequency-division seismic data, the optimal seismic frequency band information, historical gamma ray logging parameters and the standardized gamma ray logging parameters.

2 Claims, 1 Drawing Sheet

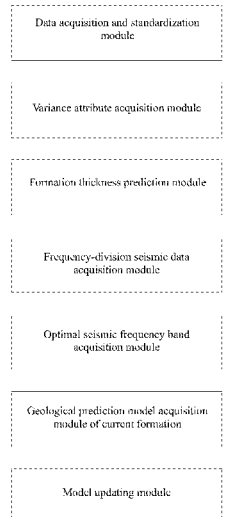

(56) References Cited

OTHER PUBLICATIONS

English translation of priority document CN202311353155.9, Oct. 19, 2023. (Year: 2023).*
English translation of CN110685600, Jan. 19, 2021. (Year: 2021).*

* cited by examiner

```
┌─────────────────────────────────────┐
│  Data acquisition and standardization│
│              module                  │
└─────────────────────────────────────┘

┌─────────────────────────────────────┐
│   Variance attribute acquisition module │
└─────────────────────────────────────┘

┌─────────────────────────────────────┐
│   Formation thickness prediction module │
└─────────────────────────────────────┘

┌─────────────────────────────────────┐
│    Frequency-division seismic data   │
│           acquisition module         │
└─────────────────────────────────────┘

┌─────────────────────────────────────┐
│    Optimal seismic frequency band    │
│           acquisition module         │
└─────────────────────────────────────┘

┌─────────────────────────────────────┐
│  Geological prediction model acquisition│
│        module of current formation   │
└─────────────────────────────────────┘

┌─────────────────────────────────────┐
│          Model updating module       │
└─────────────────────────────────────┘
```

SYSTEM FOR UPDATING CLASTIC ROCK LITHOLOGY MODEL BY WELL-TO-SEISMIC INTEGRATION WITH DEEP EARTH OIL AND GAS PRECISION NAVIGATION

CROSS-REFERENCE TO RELATED APPLICATIONS

The application claims priority to Chinese patent application No. 202311353155.9, filed on Oct. 19, 2023, the entire contents of which are incorporated herein by reference.

TECHNICAL FIELD

The present invention belongs to the technical field of geological exploration, and more particularly relates to a system for updating a clastic rock lithology model by well-to-seismic integration with deep earth oil and gas precision navigation.

BACKGROUND

A deep earth precision navigation technology may be used in deep oil and gas exploration to guide drillers to optimize a well trajectory to a designated position of an oil and gas reservoir to obtain a maximum oil discharge area and optimal recovery rate, and has become a cutting-edge technology to improve the oil and gas production of a single well and the benefits of oilfield development. A precision inversion algorithm is based on real-time uploaded geophysical data to establish a dynamically adjusted prediction model for geosteering so as to adapt to a higher reservoir encounter rate in strong heterogeneous reservoirs.

A forward simulation method simulates the distribution and change law of underground rock petrophysical properties through mathematical modeling and computer simulation, and predicts the characteristics of underground geological structure and lithology distribution. However, simulation results are affected by factors such as initialization and model selection, and require a lot of calculations and model parameter adjustments.

A lithology inference method is used to perform lithology inferences through geological data such as rock chip composition and electrical logging to establish a lithology model, and predict lithological characteristics of a next borehole. However, the underground geological structure is complex and has large lithology changes, resulting in a large deviation in the inference results in response to the prediction based on previous drilling data.

An inversion simulation method may comprehensively use a variety of geophysical data to improve the prediction accuracy and reliability, simulate physical properties of underground rocks, and directly predict a geological structure and lithology, avoiding errors of lithology inference and subjective judgment.

For clastic reservoirs, the heterogeneity of the set superposition in a longitudinal direction may be encountered in the process of establishing a geological model while drilling. In the process of geophysical data processing, high-frequency components may be regarded as noise in the face of a large set of sandstone or mudstone in some intervals. However, high-frequency components may be regarded as key information in the face of sand-mudstone interbedding in some intervals.

How to make quick and accurate inversion decisions during drilling and determine an appropriate seismic frequency band as the basis for inversion and prediction is a key for real-time update of a prediction model for geosteering.

SUMMARY

In order to solve the above-mentioned problem in the prior art, that is, a problem that a quick and accurate inversion decision is hardly made in the drilling process due to high complexity of a formation in the existing logging while drilling in the presence of a deviation in the prediction of geological conditions of different formations with a single model, the present invention provides a system for updating a clastic rock lithology model by well-to-seismic integration with deep earth oil and gas precision navigation. The system includes:

a data acquisition and standardization module, configured to acquire historical seismic data and historical logging data; and collect original seismic data and original logging data while drilling, and acquire seismic data from which outliers are eliminated and logging data from which outliers are eliminated through an isolated forest algorithm; and standardize the seismic data from which the outliers are eliminated and the logging data from which the outliers are eliminated to obtain standardized seismic data and standardized logging data, the standardized logging data including standardized gamma ray logging parameters;

a variance attribute acquisition module, configured to extract variance attribute characteristics of the standardized gamma ray logging parameters to obtain a variance attribute curve while drilling;

a formation thickness prediction module, configured to acquire a predicted formation thickness value of each set based on the variance attribute curve while drilling;

a frequency-division seismic data acquisition module, configured to acquire frequency-division seismic data based on the standardized seismic data by means of a frequency-division processing method based on wavelet transform;

an optimal seismic frequency band acquisition module, configured to acquire optimal seismic frequency band information based on the predicted formation thickness value of each set;

a geological prediction model acquisition module of a current formation, configured to establish a geological prediction model of the current formation based on the frequency-division seismic data, the optimal seismic frequency band information, historical gamma ray logging parameters in the historical logging data, and the standardized gamma ray logging parameters; and a model updating module, configured to acquire new original seismic data by repeating the functions of the data acquisition and standardization module, the variance attribute acquisition module, the formation thickness prediction module, the frequency-division seismic data acquisition module, the optimal seismic frequency band acquisition module and the geological prediction model acquisition module of the current formation in response to each drill to a preset depth interval, generate an updated geological prediction model of the current formation, and guide a drilling trajectory through the updated geological prediction model of the current formation.

In some preferred schemes, a method of obtaining the standardized gamma ray logging parameters includes the following steps:

A10: using the original seismic data and the original logging data as a data set x to be processed;

A20: randomly selecting $\varphi$ data points from the data set X to be processed to form a data subset X' to be processed, and storing in a root node the data subset x' to be processed;

A30: randomly selecting a dimension q from the data set x to be processed, and randomly generating a break point p in the dimension q, where the break point p satisfies min $(x_{i,j},j=q,x_{ij}\in X')<p<\max(x_{i,j},j=q,x_{ij}\in X')$, j represents a serial number of the break point, and i represents a data category;

A40: generating a hyperplane, which divides data in the dimension q into two subspaces, according to the break point p; and specifying data points of the dimension q with values less than p to be placed into a first leaf node, and data points with values greater than or equal to p to be placed into a second leaf node;

A50: performing recursion on the methods in A30 to A40 until all leaf nodes have only one data point or an isolated tree has reached a preset height;

A60: repeating the methods in A30 to A50 until T isolated trees are generated, wherein the T isolated trees represent: the isolated tree has no external nodes of leaf nodes, or has two leaf nodes $(T_l, T_r)$ and one internal node test; the internal node test of the T isolated trees consists of a dimension q and a break point p, and points of q<p belong to $T_l$, and on the contrary, to $T_r$;

A70: forming the T isolated trees into an isolated tree forest, setting each data point $x_i$ to traverse each isolated tree, and calculating a height $h(x_i)$ of a data point $x_i$ in each isolated tree, that is, a number of edges passed by the data point $x_i$ from a root node to a leaf node of the isolated tree; calculating an average height of the data point $x_i$ in the isolated tree forest, and normalizing the average heights of all data points to obtain a normalized average height $\overline{h(x_i)}$ of the data points;

A80: calculating an outlier score $s(x, \varphi)$ based on the normalized average height $\overline{h(x_i)}$ of the data points:

$$s(x, \varphi) = 2^{-\frac{E(\overline{h(x_i)})}{\overline{c(\varphi)}}};$$

where $\overline{c(\varphi)}$ represents an average value of path lengths of a binary tree constructed by $\varphi$ data points, and $E(*)$ represents an expectation;

$$\overline{c(\varphi)} = \begin{cases} 2H(\varphi-1) - \frac{2(\varphi-1)}{\varphi}, & \varphi > 2 \\ 1, & \varphi = 2 \\ 0, & \varphi < 2 \end{cases};$$

where H(i) represents a harmonic number, and is estimated by ln(i)+0.5772156649, 0.5772156649 being a Euler's constant;

eliminating corresponding data points in response to the outlier score $s(x, \varphi)$ being less than a preset outlier threshold s to obtain seismic data from which outliers are eliminated and logging data $C=\{c_1, \ldots, c_\alpha, \ldots, c_m\}$ from which outliers are eliminated, $1 \leq \alpha \leq m$, $c_\alpha \in C$, and m presents a number of data points in the seismic data from which the outliers are eliminated and a number of data points in the logging data from which the outliers are eliminated;

A90: continuously standardizing the seismic data from which the outliers are eliminated and the logging data from which the outliers are eliminated to obtain the standardized seismic data and the standardized logging data:

$$c_z = \frac{(g_z - \text{Average}(g))}{v}$$

where gz represents a data value of a $z^{th}$ sampling point of the seismic data from which the outliers are eliminated or the logging data from which the outliers are eliminated, and Average represents a calculated average value; g represents all data sample points of the seismic data from which the outliers are eliminated or the logging data from which the outliers are eliminated; v represents a variance of the seismic data from which the outliers are eliminated or a variance of the logging data from which the outliers are eliminated; and $c_z$ represents a data value of a $z^{th}$ sampling point of the standardized seismic data from which the outliers are eliminated and the standardized logging data from which the outliers are eliminated.

In some preferred schemes, the variance attribute acquisition module is specifically configured to:

set a time window size w of a curve sequence with the variance attribute characteristics of the standardized gamma ray logging parameters according to a target formation thickness, and calculate a variance value var of the standardized gamma ray logging parameters within the time window range of the curve sequence:

$$\text{var} = \frac{\sum_{n=1}^{n=w}(GR_n - \text{mean}(GR))^2}{w};$$

$$\text{mean}(GR) = \frac{\sum_{n=1}^{n=w} GR_n}{w};$$

where n represents a GR curve sampling point, $GR_n$ represents a value of an $n^{th}$ GR sampling point, and w represents the time window size; and calculate each sampling point to obtain a variance attribute curve while drilling.

In some preferred schemes, the formation thickness prediction module is specifically configured to:

take the derivative of the variance attribute curve while drilling to acquire a transient attribute of the variance while drilling;

extract maximum points in the transient attribute of the variance while drilling to acquire a mutation point detection result;

input new sampling points, repeatedly acquire transient attributes of the variance while drilling to obtain a plurality of mutation point detection results, and determine that different mutation point detection results are of separate sets to obtain real-time updated set interface depth judgment results; and count a minimum variance value $\text{var}_{min}$ and a corresponding maximum formation thickness $h_{max}$, as well as a maximum variance value $\text{var}_{max}$ and a corresponding minimum formation thickness $h_{min}$ according to the variance attribute curve while drilling and the real-time updated set interface depth judgment results, establish a linear formation thickness prediction model, and further calculate a predicted formation thickness value $h_r$ of each set:

$$h_r = \frac{h_{max} - h_{min}}{\text{var}_{min} - \text{var}_{max}} * (\text{var}_r - \text{var}_{max}) + h_{min}.$$

In some preferred schemes, the frequency-division seismic data acquisition module is specifically configured to:
design a processed wavelet basis function, which matches the original seismic data better, based on the standardized seismic data by means of a Morlet wavelet basis function:

$$\psi_g(t) = \frac{k}{\sqrt{2\pi}\,\sigma^3} e^{-\frac{t^2}{2\sigma^2} + \omega 2\pi\mu t}\left(1 - \frac{t^2}{\sigma^2} + 4\pi^2\mu^2\sigma^2 + \omega 4\pi\mu t\right)$$

where $\psi_g$ represents the wavelet basis function; t represents time; k represents a variable that satisfies a normalization condition of the processed wavelet basis function; σ represents a time-frequency two-dimensional resolution interval; μ represents a constant that controls a central position of a frequency after the wavelet transform; ω represents an imaginary unit;
allow the processed wavelet basis function to satisfy the normalization condition $\|\psi_g\|^2 = 1$, and set:

$$k = \sqrt{2\sigma}\,\pi^{\frac{1}{4}}\left(\mu^4 + \frac{48\mu^2\sigma^2\pi^2 + 3}{64\sigma^4\pi^4}\right)^{-\frac{1}{2}};$$

input all the seismic trace data, and perform frequency-division transform on a seismic trace through the processed wavelet basis function to obtain frequency-division seismic data:

$$W^g(a, b) = \frac{2a^2 k_2}{f_p^3 \sqrt{\alpha}} e^{-2\sigma^2\pi^2 + \frac{\beta^2}{4\alpha}}\left(\left(\frac{\beta}{2\alpha}\right)^4 + \frac{3}{\alpha}\left(\frac{\beta}{2\alpha}\right)^2 + 3\left(\frac{1}{2\alpha}\right)^2\right);$$

where a represents a scale factor; b represents a time-shift factor; $W^g(a, b)$ represents an amplitude value at a specific frequency a and a specific time b; $f_p$ represents a frequency of a wavelet basis; α and β are distribution parameters in a normal distribution N(β/2α, 1/2α), respectively.

In some preferred schemes, the optimal seismic frequency band acquisition module is specifically configured to:
calculate a ratio of the predicted formation thickness value of each set to a wavelength of seismic waves, superpose reflected waves generated by a formation top and a formation bottom to form a strong amplitude signal in response to the ratio of the predicted formation thickness value of each set to the wavelength of seismic waves being ½, and calculate a ratio of a seismic wave velocity to a predicted formation thickness value of the corresponding set to obtain the optimal frequency band information.

In some preferred schemes, the geological prediction model acquisition module of the current formation is specifically configured to:
determine a formation time window top interface, a main frequency f(Hz) and a complete seismic wave wavelength Δt=1/f(s) according to three-dimensional curved surface data of a target horizon $t_1(x,y)$ determined according to the historical seismic data, extend the three-dimensional curved surface data of the target horizon downward by Δt to obtain a formation time window bottom interface, and obtain a formation time window and a formation time window size;
intercept seismic waveform data of an interest interval based on the formation time window, obtain seismic waveform sampling data of the interest interval, resample the seismic waveform sampling data of the interest interval, and obtain seismic waveform resampling data of the interest interval;
cluster the seismic waveform resampling data of the interest interval to obtain a waveform clustering result of each frequency band; and
establish a geological prediction model of the current formation based on the clustering data of the interest interval, the frequency-division seismic data, and the optimal seismic frequency band information.

In some preferred schemes, the clustering the seismic waveform resampling data of the interest interval to obtain the waveform clustering result of each frequency band specifically includes:
randomly selecting k current clustering centers according to the seismic waveform resampling data of the interest interval, an iteration step number t being 0 at this time, denoted as $\mu_1^{(0)}, \mu_2^{(0)}, \ldots, \mu_k^{(0)}$;
assigning each data point $x_i$ to the nearest clustering center:

$$c_i^t \leftarrow \text{argmin}_k \|x_i - \mu_k^t\mu^2;$$

adjusting each current clustering center $\mu_{k1}^{(0)}$, k1 being any integer from 1 to k; recalculating a clustering center of a corresponding cluster to obtain a new clustering center:

$$\mu_k^{(t+1)} \leftarrow -\text{argmin}_\mu \sum_{i:c_i^t=k}^{b} \|x_i - \mu\|^2;$$

replacing the current clustering center with the new clustering center, selecting another data point and allocating the data point to the nearest clustering center, and acquiring a new clustering center until a loss function $$J(c, \mu) = \min \sum_{i=1}^{M} \|x_i - \mu_{c_i}\|^2$$

is less than a preset threshold; obtaining clustering data of the interest interval; and further obtaining a waveform clustering result of each frequency band.

The present invention has the following beneficial effects.
(1) According to the present invention, by defining a characteristic attribute of a logging-while-drilling curve as a quantitative index to evaluate the formation thickness, a correspondence relationship between this quantitative index and the seismic data with dominant frequency band is established, and a set of technical processes for updating the geological model while drilling is formulated, so that the model can automatically update parameters according to the change in drilling depth to adapt to the complexity of the formation, so as to realize the real-time, effective and accurate prediction of geologies of different formations.

BRIEF DESCRIPTION OF DRAWINGS

The FIGURE is a structural block diagram of a system for updating a clastic rock lithology model by well-to-seismic integration with deep earth oil and gas precision navigation as provided by an embodiment of the present description.

DETAILED DESCRIPTION OF THE EMBODIMENTS

The present application will be further described in detail below with reference to the accompanying drawings and embodiments. It may be understood that the specific embodiments described here are only used to explain the related art, but not intended to limit the present invention. In addition, it should be noted that, for ease of description, only the parts related to the present invention are shown in the accompanying drawings.

It should be noted that the embodiments in the present application and the features in the embodiments can be combined with each other if there is no conflict. The present application will be described below in detail with reference to the accompanying drawings and in conjunction with embodiments.

A first embodiment of the present invention provides a system for updating a clastic rock lithology model by well-to-seismic integration with deep earth oil and gas precision navigation. As shown in FIG. 1, the system includes a data acquisition and standardization module, a variance attribute acquisition module, a formation thickness prediction module, a frequency-division seismic data acquisition module, an optimal seismic frequency band acquisition module, a geological prediction model acquisition module of a current formation, and a model updating module.

The data acquisition and standardization module is configured to acquire historical seismic data and historical logging data; and
  collect original seismic data and original logging data while drilling, and acquire seismic data from which outliers are eliminated and logging data from which outliers are eliminated through an isolated forest algorithm; and standardize the seismic data from which the outliers are eliminated and the logging data from which the outliers are eliminated to obtain standardized seismic data and standardized logging data, the standardized logging data including standardized gamma ray logging parameters.

In the present embodiment, a method of obtaining the standardized gamma ray logging parameters includes the following steps:
  A10: using the original seismic data and the original logging data as a data set X to be processed;
  A20: randomly selecting $\varphi$ data points from the data set X to be processed to form a data subset X' to be processed, and storing in a root node the data subset x' to be processed;
  A30: randomly selecting a dimension q from the data set X to be processed, and randomly generating a break point p in the dimension q, where the break point p satisfies $\min(x_{ij}, j=q, x_{ij} \in X') < p < \max(x_{ij}, j=q, x_{ij} \in X')$, j represents a serial number of the break point, and i represents a data category;
  A40: generating a hyperplane, which divides data in the dimension q into two subspaces, according to the break point p; and specifying data points of the dimension q with values less than p to be placed into a first leaf node, and data points with values greater than or equal to p to be placed into a second leaf node;
  A50: performing recursion on the methods in A30 to A40 until all leaf nodes have only one data point or an isolated tree has reached a preset height;
  A60: repeating the methods in A30 to A50 until T isolated trees are generated, wherein the T isolated trees represent: the isolated tree has no external nodes of leaf nodes, or has two leaf nodes $\{T_l, T_r\}$ and one internal node test; the internal node test of the T isolated trees consists of a dimension q and a break point p, and points of $q<p$ belong to $T_l$, and on the contrary, to $T_r$;
  A70: forming the T isolated trees into an isolated tree forest, setting each data point $x_i$ to traverse each isolated tree, and calculating a height $h(x_i)$ of a data point $x_i$ in each isolated tree, that is, a number of edges passed by the data point $x_i$ from a root node to a leaf node of the isolated tree; calculating an average height of the data point $x_i$ in the isolated tree forest, and normalizing the average heights of all data points to obtain a normalized average height $\overline{h(x_i)}$ of the data points;
  A80: calculating an outlier score $s(x, \varphi)$ based on the normalized average height $h(x_i)$ of the data points:

$$s(x, \varphi) = 2^{-\frac{E(\overline{h(x_i)})}{c(\varphi)}};$$

where $c(\varphi)$ represents an average value of path lengths of a binary tree constructed by $\varphi$ data points, and $E(*)$ represents an expectation;

$$\overline{c(\varphi)} = \begin{cases} 2H(\varphi-1) - \frac{2(\varphi-1)}{\varphi}, & \varphi > 2 \\ 1, & \varphi = 2 \\ 0, & \varphi < 2 \end{cases};$$

where $H(i)$ represents a harmonic number, and is estimated by $\ln(i)+0.5772156649$, 0.5772156649 being a Euler's constant;
eliminating corresponding data points in response to the outlier score $s(x, \varphi)$ being less than a preset outlier threshold s to obtain seismic data from which outliers are eliminated and logging data $C=\{c_1, \ldots, c_\alpha, \ldots, c_m\}$ from which outliers are eliminated, $1 \leq \alpha \leq m$, $c_\alpha \in C$, and m represents a number of data points in the seismic data from which the outliers are eliminated and a number of data points in the logging data from which the outliers are eliminated; and
  A90: continuously standardizing the seismic data from which the outliers are eliminated and the logging data from which the outliers are eliminated to obtain the standardized seismic data and the standardized logging data:

$$c_z = \frac{(g_z - \text{Average}(g))}{v};$$

where $g_z$ represents a data value of a $z^{th}$ sampling point of the seismic data from which the outliers are eliminated or the logging data from which the outliers are eliminated, and Average represents a calculated average value; g represents all data sample points of the seismic data from which the outliers are eliminated or the logging data from which the outliers are eliminated; v represents a variance of the seismic data from which the outliers are eliminated or a variance of the logging data from which the outliers are eliminated; and $c_z$ represents a data value of a $z^{th}$ sampling point of the standardized seismic data from which the outliers are eliminated or the standardized logging data from which the outliers are eliminated.

The variance attribute acquisition module is configured to extract variance attribute characteristics of standardized gamma ray logging parameters to obtain a variance attribute curve while drilling.

In the present embodiment, the variance attribute acquisition module is specifically configured to:
set a time window size w of a curve sequence with the variance attribute characteristics of the standardized gamma ray logging parameters according to a target formation thickness, and calculate a variance value var of the standardized gamma ray logging parameters within the time window range of the curve sequence:

$$\text{var} = \frac{\sum_{n=1}^{n=w}(GR_n - \text{mean}(GR))^2}{w};$$

$$\text{mean}(GR) = \frac{\sum_{n=1}^{n=w} GR_n}{w};$$

where n represents a GR curve sampling point, $GR_n$ represents a value of an $n^{th}$ GR sampling point, and w represents the time window size.

The formation thickness prediction module is configured to acquire a predicted formation thickness value of each set based on the variance attribute curve while drilling.

In the present embodiment, the formation thickness prediction module is specifically configured to:
take the derivative of the variance attribute curve while drilling to acquire a transient attribute of the variance while drilling;
extract maximum points in the transient attribute of the variance while drilling to acquire a mutation point detection result; and
input new sampling points, repeatedly acquire transient attributes of the variance while drilling to obtain a plurality of mutation point detection results, and determine that different mutation point detection results are of separate sets to obtain real-time updated set interface depth judgment results.

In the present embodiment, each mutation point encountered in the process of real-time drilling is regarded as a set interface, and every two set interfaces are regarded as a layer, so that the layer encountered in drilling may be detected in real time in the real-time drilling process; and the smaller the variance, the better the stratigraphic homogeneity within the set; and on the contrary, the larger the variance, the thinner interbedding of a formation within the set.

The formation thickness prediction module is also configured to count a minimum variance value $\text{var}_{min}$ and a corresponding maximum formation thickness $h_{max}$, as well as a maximum variance value $\text{var}_{max}$ and a corresponding minimum formation thickness $h_{min}$ according to the variance attribute curve while drilling and the real-time updated set interface depth judgment results, establish a linear formation thickness prediction model, and further calculate a predicted formation thickness value $h_r$ of each set:

$$h_r = \frac{h_{max} - h_{min}}{\text{var}_{min} - \text{var}_{max}} * (\text{var}_r - \text{var}_{max}) + h_{min}.$$

The frequency-division seismic data acquisition module is configured to acquire frequency-division seismic data based on the standardized seismic data by means of a frequency-division processing method based on wavelet transform.

In the present embodiment, the frequency-division seismic data acquisition module is specifically configured to:
design a processed wavelet basis function, which matches the original seismic data better, based on the standardized seismic data by means of a Morlet wavelet basis function:

$$\psi_g(t) = \frac{k}{\sqrt{2\pi}\sigma^3} e^{-\frac{t^2}{2\sigma^2} + \omega 2\pi\mu t}\left(1 - \frac{t^2}{\sigma^2} + 4\pi^2\mu^2\sigma^2 + \omega 4\pi\mu t\right);$$

where $\psi_g$ represents the wavelet basis function; t represents time; k represents a variable that satisfies a normalization condition of the processed wavelet basis function; σ represents a time-frequency two-dimensional resolution interval; μ represents a constant that controls a central position of a frequency after the wavelet transform; and ω represents an imaginary unit; in this scheme, i should be used to represent the imaginary unit, but ω is used to represent the imaginary unit in order to avoid the misuse of parameters; in the present embodiment, the wavelet basis function is represented in the form of a normal distribution formula, in order to ensure the normalization condition of the wavelet basis function;
allow the processed wavelet basis function to satisfy the normalization condition $\|\psi_g\|^2=1$, and set a transition item as:

$$k = \sqrt{2\sigma}\pi^{\frac{1}{4}}\left(\mu^4 + \frac{48\mu^2\sigma^2\pi^2 + 3}{64\sigma^4\pi^4}\right)^{-\frac{1}{2}};$$

input all the seismic trace data, and perform frequency-division transform on a seismic trace through the processed wavelet basis function to obtain frequency-division seismic data:

$$W^g(a,b) = \frac{2a^2 k_2}{f_p^3\sqrt{a}} e^{-2\sigma^2\pi^2\mu^2 + \frac{\beta^2}{4\alpha}}\left(\left(\frac{\beta}{2\alpha}\right)^4 + \frac{3}{\alpha}\left(\frac{\beta}{2\alpha}\right)^2 + 3\left(\frac{1}{2\alpha}\right)^2\right);$$

where a represents a scale factor; b represents a time-shift factor; $W^g(a, b)$ represents an amplitude value at a specific frequency a and a specific time b; $f_p$ represents a frequency of a wavelet basis; α and β are distribution parameters in a normal distribution N(β/2α, 1/2α) respectively.

The optimal seismic frequency band acquisition module is configured to acquire optimal seismic frequency band information based on the predicted formation thickness value of each set.

In the present embodiment, a method of acquiring the optimal seismic frequency band information specially includes:

calculating a ratio of the predicted formation thickness value of each set to a wavelength of seismic waves, superposing reflected waves generated by a formation top and a formation bottom to form a strong amplitude signal in response to the ratio of the predicted formation thickness value of each set to the wavelength of seismic waves being ½, and calculating a ratio of a seismic wave velocity to a predicted formation thickness value of the corresponding set to obtain the optimal frequency band information.

The geological prediction model acquisition module of the current formation is configured to establish a geological prediction model of the current formation based on the frequency-division seismic data, the optimal seismic frequency band information, historical gamma ray logging parameters in the historical logging data, and the standardized gamma ray logging parameters.

In the present embodiment, the geological prediction model acquisition module of the current formation is specifically configured to:

determine a formation time window top interface, a main frequency f(Hz) and a complete seismic wave wavelength $\Delta t=1/f(s)$ according to three-dimensional curved surface data of a target horizon $t_1(xy)$ determined according to the historical seismic data, extend the three-dimensional curved surface data of the target horizon downward by $\Delta t$ to obtain a formation time window bottom interface, and obtain a formation time window and a formation time window size;

intercept seismic waveform data of an interest interval based on the formation time window, obtain seismic waveform sampling data of the interest interval, resample the seismic waveform sampling data of the interest interval, and obtain seismic waveform resampling data of the interest interval; and cluster the seismic waveform resampling data of the interest interval to obtain a waveform clustering result of each frequency band.

In the present embodiment, the clustering the seismic waveform resampling data of the interest interval to obtain the waveform clustering result of each frequency band specifically includes:

randomly selecting k current clustering centers according to the seismic waveform resampling data of the interest interval, an iteration step number t being 0 at this time, denoted as $\mu_1^{(0)}, \mu_2^{(0)}, \ldots, \mu_k^{(0)}$;

assigning each data point $x_i$ to the nearest clustering center:

$c_i^t \leftarrow \text{argmin}_k \|x_i - \mu_k^t\|^2$;

adjusting each current clustering center $\mu_{k1}^{(0)}$, k1 being any integer from 1 to k; recalculating a clustering center of a corresponding cluster to obtain a new clustering center:

$\mu_k^{(t+1)} \leftarrow -\text{argmin}_\mu \sum_{i: c_i^t = k}^{b} \|x_i - \mu\|^2$;

replacing the current clustering center with the new clustering center, selecting another data point and allocating the data point to the nearest clustering center, and acquiring a new clustering center until a loss function $J(c, \mu) = \min \Sigma_{i=1}^M \|x_i - \mu_{c_i}\|^2$ is less than a preset threshold; obtaining clustering data of the interest interval; and further obtaining a waveform clustering result of each frequency band; and establishing a geological prediction model of the current formation based on the clustering data of the interest interval, the frequency-division seismic data, and the optimal seismic frequency band information.

The model updating module is configured to acquire new original seismic data by repeating the functions of the data acquisition and standardization module, the variance attribute acquisition module, the formation thickness prediction module, the frequency-division seismic data acquisition module, the optimal seismic frequency band acquisition module and the geological prediction model acquisition module of the current formation in response to each drill to a preset depth interval, generate an updated geological prediction model of the current formation, and guide a drilling trajectory through the updated geological prediction model of the current formation. Although the steps are described in a precedence order in the above embodiments, a person skilled in the art can understand that, in order to achieve the effects of the present embodiment, different steps are not necessarily performed according to this order, which may be executed simultaneously (in parallel) or in a reverse order, and these simple changes are within the protection scope of the present invention.

A person skilled in the art can clearly understand that, for the convenience and conciseness of the description, the specific working process of the system as described above and the relevant descriptions may refer to the corresponding process in the foregoing method embodiment, which is not repeated herein.

It should be noted: the system for updating the geological model while drilling in real time in deep earth precision navigation provided by the above embodiment is illustrated only by the division of the above-mentioned functional modules. In actual applications, the above functions can be allocated to be completed by different functional modules as required. That is, the modules or steps in the embodiments of the present invention are further decomposed or combined. For example, the modules in the above embodiments may be merged into one module, or may also be further partitioned into a plurality of sub-modules to complete all or part of the functions described above. The names of the modules and steps involved in the embodiments of the present invention are only for the purpose of distinguishing each module or step, and shall not be regarded as an improper limitation of the present invention.

Moreover, terms "include" or any analog thereof are intended to cover an nonexclusive containing, such that a process, a method, an item or a device/apparatus containing a series of elements not only includes these elements, but also includes other elements that are not set forth specifically, or also includes an inherent element of such a process, method, item or device/apparatus.

In this case, the technical solutions f the present invention have been described in conjunction with the preferred implementations shown in the accompanying drawings. However, it is easily understood by a person skilled in the art that the protection scope of the present invention is obviously not limited to these specific implementations. On the premise of not deviating from the principle of the present invention, a person skilled in the art may make equivalent changes or substitutions to the relevant technical features, and technical solutions after these changes or substitutions will fall within the protection scope of the present invention.

What is claimed is:

1. A method for updating geological prediction model while drilling, the method is configured to be performed on a system comprising a data acquisition and standardization module, a variance attribute acquisition module, a formation thickness prediction module, the frequency-division seismic data acquisition module, an optimal seismic frequency band acquisition module, a geological prediction model acquisition module and a model updating module, the method comprising:

acquiring historical seismic data and historical logging data by the data acquisition and standardization module; and collecting original seismic data and original logging data while drilling, and acquiring logging data from which outliers are eliminated through an isolated forest algorithm; eliminating the outliers from the logging data to obtain standardized logging data, the standardized logging data comprising standardized gamma ray logging parameters, obtaining the standardized logging data comprising the following steps:

A10: using the original logging data as a data set X to be processed;

A20: randomly selecting φ data points from the data set X to be processed to form a data subset X' to be processed, and storing in a root node the data subset x' to be processed;

A30: randomly selecting a dimension q from the data set X to be processed, and randomly generating a break point p in the dimension q, where the break point p satisfies $\min(x_{ij}, j=q, x_{ij} \in X') < p < \max(x_{ij}, j=q, x_{ij} \in X')$, j represents a serial number of the break point, and i represents a data category;

A40: generating a hyperplane, which divides data in the dimension q into two subspaces, according to the break point p; and specifying data points of the dimension q with values less than p to be placed into a first leaf node, and data points with values greater than or equal to p to be placed into a second leaf node;

A50: performing recursion on the methods in A30 to A40 until the leaf nodes have only one data point or an isolated tree has reached a preset height;

A60: repeating the methods in A30 to A50 until T isolated trees are generated, wherein the T isolated trees represent: isolated trees having no external nodes of leaf nodes, or having two leaf nodes ($T_l$, $T_r$) and one internal node test; the internal node test of the T isolated trees consists of a dimension q and a break point p, and points of q<p belong to $T_l$, and points of q>p belong to $T_r$;

A70: forming the T isolated trees into an isolated tree forest, setting each data point $x_i$ to traverse each isolated tree, and calculating a height $h(x_i)$ of a data point $x_i$ in each isolated tree, that is, a number of edges passed by the data point $x_i$ from a root node to a leaf node of the isolated tree; calculating an average height of the data point $x_i$ in the isolated tree forest, and normalizing the average height of the data point Xi to obtain a normalized average height $\overline{h(x_i)}$ of the data points;

A80: calculating an outlier score s(x, φ) based on the normalized average height $\overline{h(x_i)}$ of the data points:

$$s(x, \varphi) = 2^{-\frac{E(h(x_i))}{\overline{c(\varphi)}}};$$

where $\overline{c(\varphi)}$ represents an average value of path lengths of a binary tree constructed by φ data points, and E(*) represents an expectation;

$$\overline{c(\varphi)} = \begin{cases} 2H(\varphi-1) - \frac{2(\varphi-1)}{\varphi}, & \varphi > 2 \\ 1, & \varphi = 2 \\ 0, & \varphi < 2 \end{cases};$$

where H(i) represents a harmonic number, and is estimated by ln(i)+0.5772156649, 0.5772156649 being a Euler's constant;

eliminating corresponding data points in response to the outlier score s(x, φ) being less than a preset outlier threshold s to obtain logging data C={$c_1$, ..., $c_\alpha$, ..., $c_m$} from which the outliers are eliminated, 1≤α≤m, $c_\alpha \in C$, and m represents a number of data points in the logging data from which the outliers are eliminated;

A90: continuously standardizing the logging data from which the outliers are eliminated to obtain the standardized logging data:

$$c_z = \frac{(g_z - \text{Average}(g))}{v};$$

where $g_z$ represents a data value of a $z^{th}$ sampling point of the logging data from which the outliers are eliminated, and Average represents a calculated average value; g represents all data sample points of the logging data from which the outliers are eliminated; v represents a variance of the logging data from which the outliers are eliminated; $c_z$ represents a data value of a $z^{th}$ sampling point of the standardized logging data from which the outliers are eliminated;

extracting variance attribute characteristics of standardized gamma ray logging parameters by the variance attribute acquisition module to obtain a variance attribute curve while drilling;

the variance attribute acquisition module being specifically configured to:

set a time window size w of a curve sequence with the variance attribute characteristics of the standardized gamma ray logging parameters according to a target formation thickness, and calculate a variance value var of the standardized gamma ray logging parameters within the time window range of the curve sequence:

$$\text{var} = \frac{\sum_{n=1}^{n=w}(GR_n - \text{mean}(GR))^2}{w};$$

$$\text{mean}(GR) = \frac{\sum_{n=1}^{n=w} GR_n}{w};$$

where n represents a GR curve sampling point, $GR_n$ represents a value of an $n^{th}$ GR sampling point, and w represents the time window size; and calculate each sampling point to obtain the variance attribute curve while drilling;
acquiring by the formation thickness prediction module, a predicted formation thickness value of each set based on the variance attribute curve while drilling;
the formation thickness prediction module being specifically configured to:
take the derivative of the variance attribute curve while drilling to acquire a transient attribute of the variance while drilling;
extract maximum points in the transient attribute of the variance while drilling to acquire a mutation point detection result;
input new sampling points, repeatedly acquire transient attributes of the variance while drilling to obtain a plurality of mutation point detection results, and determine that different mutation point detection results are of separate sets to obtain real-time updated set interface depth judgment results; and
count a minimum variance value $\text{var}_{min}$ and a corresponding maximum formation thickness $h_{max}$, as well as a maximum variance value $\text{var}_{max}$ and a corresponding minimum formation thickness $h_{min}$ according to the variance attribute curve while drilling and the real-time updated set interface depth judgment results, establish a linear formation thickness prediction model, and further calculate a predicted formation thickness value $h_r$ of each set:

$$h_r = \frac{h_{max} - h_{min}}{\text{var}_{min} - \text{var}_{max}} * (\text{var}_r - \text{var}_{max}) + h_{min};$$

acquiring by the frequency-division seismic data acquisition module, frequency-division seismic data based on the original seismic data by means of a frequency-division processing method based on wavelet transform;
the frequency-division seismic data acquisition module being specifically configured to:
design a processed wavelet basis function, which matches the original seismic data better, based on a Morlet wavelet basis function:

$$\psi_g(t) = \frac{k}{\sqrt{2\pi}\sigma^3} e^{-\frac{t^2}{2\sigma^2} + \omega 2\pi\mu t} \left(1 - \frac{t^2}{\sigma^2} + 4\pi^2\mu^2\sigma^2 + \omega 4\pi\mu t\right);$$

where $\psi_g$ represents the wavelet basis function; t represents time; k represents a variable that satisfies a normalization condition of the processed wavelet basis function; σ represents a time-frequency two-dimensional resolution interval; μ represents a constant that controls a central position of a frequency after the wavelet transform; ω represents an imaginary unit;
allow the processed wavelet basis function to satisfy the normalization condition $\|\psi_g\|^2=1$, and set:

$$k = \sqrt{2\sigma}\pi^{\frac{1}{4}} \left(\mu^4 + \frac{48\mu^2\sigma^2\pi^2 + 3}{64\sigma^4\pi^4}\right)^{-\frac{1}{2}};$$

input all the seismic trace data, and perform frequency-division transform on a seismic trace through the processed wavelet basis function to obtain frequency-division seismic data:

$$W^g(a, b) = \frac{2a^2 k_2}{f_p^3 \sqrt{\alpha}} e^{-2\sigma^2\pi^2\mu^2 + \frac{\beta^2}{4\alpha}} \left(\left(\frac{\beta}{2\alpha}\right)^4 + \frac{3}{\alpha}\left(\frac{\beta}{2\alpha}\right)^2 + 3\left(\frac{1}{2\alpha}\right)^2\right);$$

where a represents a scale factor; b represents a time-shift factor; $W^g(a, b)$ represents an amplitude value at a specific frequency a and a specific time b; $f_p$ represents a frequency of a wavelet basis; α and β are distribution parameters in a normal distribution $N(\beta/2\alpha, 1/2\alpha)$, respectively;
acquiring by the optimal seismic frequency band acquisition module, optimal seismic frequency band information based on the predicted formation thickness value of each set;
the optimal seismic frequency band acquisition module being specifically configured to:
calculate a ratio of the predicted formation thickness value of each set to a wavelength of seismic waves, superpose reflected waves generated by a formation top and a formation bottom to form a strong amplitude signal in response to the ratio of the predicted formation thickness value of each set to the wavelength of seismic waves being ½, and calculate a ratio of a seismic wave velocity to a predicted formation thickness value of the corresponding set to obtain the optimal frequency band information;
establishing by the geological prediction model acquisition module of a current formation, a geological prediction model of the current formation based on the frequency-division seismic data, the optimal seismic frequency band information, historical gamma ray logging parameters in the historical logging data, and the standardized gamma ray logging parameters;
the geological prediction model acquisition module of the current formation being specifically configured to:
determine a formation time window top interface, a main frequency f(Hz) and a complete seismic wave wavelength Δt=1/f(s) according to three-dimensional curved surface data of a target horizon $t_1(x,y)$ determined according to the historical seismic data, extend the three-dimensional curved surface data of the target horizon downward by Δt to obtain a formation time window bottom interface, and obtain a formation time window and a formation time window size;
intercept seismic waveform data of an interest interval based on the formation time window, obtain seismic waveform sampling data of the interest interval, resample the seismic waveform sampling data of the interest interval, and obtain seismic waveform resampling data of the interest interval;
cluster the seismic waveform resampling data of the interest interval to obtain a waveform clustering result of each frequency band;
establish a geological prediction model of the current formation by means of waveform indication inversion based on the waveform clustering result of each frequency band, the frequency-division seismic data, the optimal seismic frequency band information, the historical gamma ray logging parameters and the standardized gamma ray logging parameters; and
repeating functions of the data acquisition and standardization module, the variance attribute acquisition module, the formation thickness prediction module, the frequency-division seismic data acquisition module, the optimal seismic frequency band acquisition module, and the geological prediction model acquisition module of the current formation, in response to each drill to a preset depth interval, to generate an updated geological prediction model of the current formation; and guiding a drilling trajectory through the updated geological prediction model of the current formation.

2. The method for updating geological prediction model while drilling according to claim 1, wherein the clustering the seismic waveform resampling data of the interest interval to obtain a waveform clustering result of each frequency band specifically comprises:

randomly selecting k current clustering centers according to the seismic waveform resampling data of the interest interval, an iteration step number t being 0, denoted as $\mu_1^{(0)}, \mu_2^{(0)}, \ldots, \mu_k^{(0)}$;

assigning each data point $x_i$ to a nearest clustering center:

$$c_i^t \leftarrow \mathrm{argmin}_k \|x_i - \mu_k^t\|^2;$$

adjusting each of the current clustering center $\mu_{k1}^{(0)}$, k1 being any integer from 1 to k; recalculating a clustering center of a corresponding cluster to obtain a new clustering center:

$$\mu_k^{(t+1)} \leftarrow \mathrm{argmin}_\mu \sum_{i:c_i^t=k}^b \|x_i - \mu\|^2;$$

replacing each of the current clustering center with the new clustering center, selecting another data point and allocating the data point to the nearest clustering center, and acquiring a new clustering center until a loss function $J(c, \mu) = \mathrm{min}\Sigma_{i=1}^M \|x_i - \mu_{c_i}\|^2$ is less than a preset threshold; obtaining clustering data of the interest interval; and further obtaining a waveform clustering result of each frequency band.

* * * * *